United States Patent
Mattes et al.

(10) Patent No.: US 6,487,482 B1
(45) Date of Patent: Nov. 26, 2002

(54) METHOD AND DEVICE FOR DEPLOYING A RETAINING SYSTEM

(75) Inventors: Bernhard Mattes, Sachsenheim (DE); Jörg Heckel, Kornwestheim (DE); Arno Schaumann, Ludwigsburg (DE); Michael Henne, Zaberfeld (DE); Peter Meissner, Kornwestheim (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/622,511
(22) PCT Filed: Dec. 17, 1998
(86) PCT No.: PCT/DE98/03704
§ 371 (c)(1), (2), (4) Date: Oct. 4, 2000
(87) PCT Pub. No.: WO99/42341
PCT Pub. Date: Aug. 26, 1999

(30) Foreign Application Priority Data

Feb. 20, 1998 (DE) .......................... 198 07 124

(51) Int. Cl.$^7$ .................................................. G06F 7/00
(52) U.S. Cl. ........................ 701/45; 280/734; 180/271
(58) Field of Search ................................. 307/9.1, 10.1; 701/36, 45; 280/735, 734; 340/435, 436, 438; 180/271, 282

(56) References Cited

U.S. PATENT DOCUMENTS 4,836,024 A 6/1989 Woehrl et al. ................. 73/514
5,173,614 A * 12/1992 Woehrl et al. ............. 307/10.1
5,202,831 A 4/1993 Blackburn et al. ...... 364/424.05

FOREIGN PATENT DOCUMENTS

| DE | 195 14 082 | 6/1996 |
| EP | 0 531 989 | 3/1993 |
| EP | 0 785 112 | 7/1997 |
| WO | 89 11986 | 12/1989 |
| WO | 90 03289 | 4/1990 |

OTHER PUBLICATIONS

Electronik 23/1991, pp. 46–50.** No date.

Autotechnik NO. 1–2/1997, pp. 28–33.** No date.

* cited by examiner

*Primary Examiner*—Yonel Beaulieu
(74) *Attorney, Agent, or Firm*—Kenyon & Kenyon

(57) ABSTRACT

A method and a device for deploying a restraint system, which avoids false deployments at the least possible expense by using an acceleration sensor arrangement that includes two sensitivity axes oriented in different directions. An acceleration measured with respect to one of the two sensitivity axes is used for a plausibility check of a deployment decision, which is determined from an acceleration measured with respect to the other sensitivity axis. A trigger signal is only generated if a deployment decision signal and a plausibility signal are present at the inputs of an AND logic circuit at the same time.

7 Claims, 2 Drawing Sheets

METHOD AND DEVICE FOR DEPLOYING A RETAINING SYSTEM

FIELD OF THE INVENTION

The present invention relates to a method and device for deploying a restraint system in response to the impact of a motor vehicle against an obstacle. An acceleration sensor arrangement is included that has two sensitivity axes oriented in different directions, and an evaluation circuit generating a trigger signal for the restraint system from measured accelerations.

BACKGROUND INFORMATION

U.S. Pat. No. 5,202,831 describes that two acceleration sensors are provided for detecting front-end, rear-end, and lateral impacts. One of the two acceleration sensors has a sensitivity axis in the longitudinal direction of the motor vehicle and the other has a sensitivity axis in the transverse direction of the motor vehicle. Using a device of this type, it is possible to distinguish between a front-end or a rear-end impact and a lateral impact, so that the corresponding front-end or lateral airbags can be deployed.

One important goal in the design of restraint systems in a motor vehicle is to prevent a false deployment of airbags, i.e., depending on the direction of impact, only those airbags should be deployed that offer the vehicle passengers actual protection. To guard against a false deployment of restraint devices, it is conventional, as described in German Patent 195 14 082 to make the deployment depend not only on the response signal of an acceleration sensor, but rather to design the acceleration sensor arrangement in a redundant manner. Often, in addition to acceleration sensors, safety switches (safing or arming sensors) are used. As a result of the redundant design, the expense of the restraint system is increased in an undesirable manner.

An acceleration sensor system that is designed in a redundant manner is also known from European Patent 0 785 112 A1. In this context, two or three acceleration sensors are arranged in the rotor vehicle in different locations. The acceleration sensors are arranged so that their sensitivity axes are oriented parallel to each other. The sensitivity axes therefore all point in the same direction, so that all acceleration sensors react to an acceleration of the vehicle occurring in the direction of the common sensitivity axes. Finally, the reaction of one acceleration sensor is rendered plausible by the reaction of one or two other redundant acceleration sensors.

An acceleration sensor system that is designed in a redundant manner is described in European Patent No. 0785 112. In this sensor system, two or three acceleration sensors are arranged in the motor vehicle at different locations. The acceleration sensors are arranged such that their sensitivity axes are oriented parallel to each other. Therefore, the sensitivity axes all point in the same direction, so that all acceleration sensors react to an acceleration of the vehicle occurring in the direction of the common sensitivity axes. Finally, the reaction of one acceleration sensor is rendered plausible by the reaction of one or two other redundant acceleration sensors.

SUMMARY OF THE INVENTION

An object of the present invention is to provide a method and a device that provide high reliability with respect to false deployments of the restraint system at the least possible expense for the acceleration sensor arrangement.

The object is achieved by using an acceleration sensor arrangement that has two sensitivity axes oriented in different directions and by using the acceleration measured with respect to one of the two sensitivity axes in the plausibility check of a deployment decision. An evaluation circuit determines the deployment decision from the acceleration measured with respect to the other sensitivity axis. A trigger signal is only emitted when a deployment decision signal and a plausibility signal are present at the inputs of an AND logic circuit at the same time. The expense of the device according to the present invention is reduced in comparison to conventional devices because, using the acceleration sensors necessary for measuring the accelerations of the vehicle in the longitudinal and transverse directions, a reciprocal plausibility check is carried out, and therefore redundant acceleration sensors are not required.

Thus, given two acceleration sensor elements that have different sensitivity axes, a reciprocal plausibility check can be carried out.

It is possible to use three acceleration sensor elements, of which two have sensitivity axes oriented in the same direction and the third acceleration sensor element has a sensitivity axis oriented in a different direction. In this context, one of the two acceleration sensor elements that has sensitivity axes oriented in the same direction is brought to bear on the plausibility check of the third acceleration sensor element.

In order to be able to distinguish front-end or rear-end impacts and lateral impacts clearly from each other, it is advantageous that one sensitivity axis be oriented in the longitudinal direction and the other sensitivity axis be oriented in the transverse direction of the motor vehicle.

An acceleration sensor element arranged centrally in the motor vehicle that has a sensitivity axis in the transverse direction of the motor vehicle can be brought to bear, for the plausibility check, by one or a plurality of lateral impact sensors arranged on the periphery.

The plausibility check can be carried out as a threshold decision with respect to the amplitude, the gradient or the polarity of the measured acceleration or the integral of the measured acceleration.

DETAILED DESCRIPTION

Figure 1:
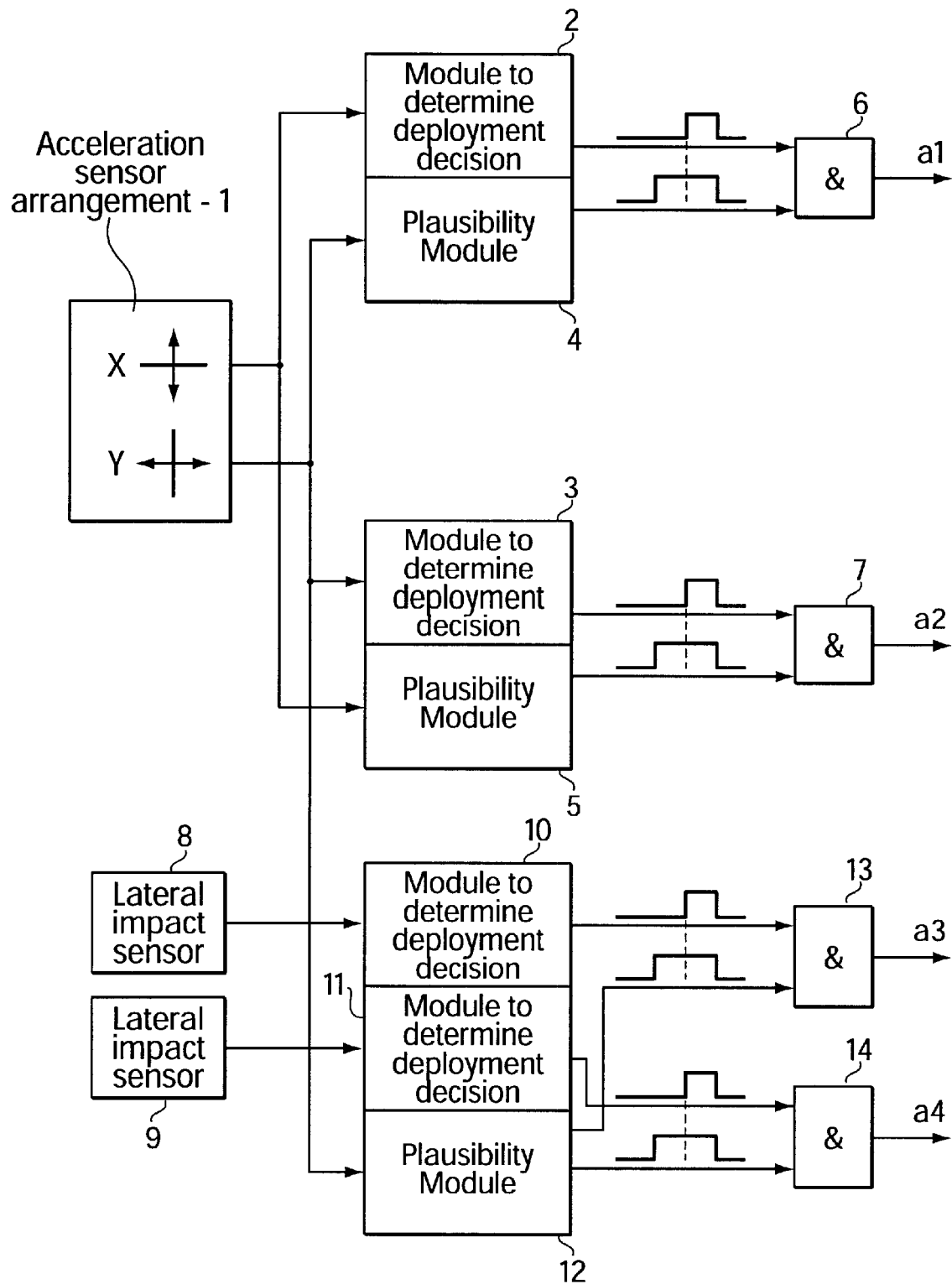
FIG. 1 shows a trigger device for a restraint system that has two acceleration sensor elements.

The trigger device depicted in FIG. 1 for a restraint system has an acceleration sensor arrangement 1 arranged centrally in the motor vehicle. This acceleration sensor arrangement 1 has two acceleration sensor elements, of which one has a sensitivity axis in the longitudinal direction (X) and the other has a sensitivity axis in the transverse direction (Y) of the motor vehicle.

Both acceleration sensor elements, for example, are micromechanical sensors, which are arranged on a common substrate. Of course, the two acceleration sensor elements can also be arranged on separate substrates. A micromechanical acceleration sensor is described, e.g., in Electronik 23/1991, pp. 46 through 50. In Autotechnik No. 1-2/1997, pp. 28 through 33, in addition to micromechanical sensors, other sensor principles (piezoelectrical sensors, sensors having foil strain gauges, magnet-mass sensors, etc.) are described that also may be used in the present invention.

Whereas, in the exemplary embodiment depicted, the sensitivity axes of the acceleration sensor elements are aligned orthogonally with respect to each other, acceleration sensors having sensitivity axes in other directions, diverging by 90°, can also be used.

Installed in the motor vehicle are, on the one hand, restraining means (e.g., airbags, belt tighteners) which provide protection in the event of front-end and rear-end impacts, and, on the other hand, restraining means to protect motor vehicle passengers in the event of lateral impacts. For each of the two directions of impact, there is provided one module 2, 3 to determine a deployment decision from a measured acceleration signal and one module 4, 5 for the plausibility check of the deployment decision. The acceleration measured by the acceleration sensor element having its sensitivity axis in the X direction is led to module 2, in which a deployment decision for the restraining means is determined in response to front-end or rear-end impacts.

The deployment decision is generally a threshold decision, which is applied either to the measured acceleration itself or to a first or a second integral thereof. Which algorithm is applied for the deployment decision is not discussed here in any greater detail, because for these purposes every conventional triggering algorithm from the related art can be used.

Module 3 for the determination of a deployment decision for lateral airbags has fed to it the acceleration signal measured by the acceleration sensor element that has its sensitivity axis in the Y direction. The acceleration measured by the acceleration sensor, which has its sensitivity axis in the Y direction, is also fed to module 4 for the plausibility check of the deployment decision for the restraining means that are actuated in response to a front-end or a rear-end impact. The plausibility check is a threshold decision process, based on either the amplitude, the gradient, or the polarity of the acceleration signal itself or the integral of the acceleration. Only when both module 2 for the deployment decision as well as module 4 for the plausibility check generate an output signal to the inputs of an AND logic circuit 6 simultaneously, is actual trigger signal a1 emitted for the deploying of the restraining means that are actuated in response to a front-end or rear-end impact.

Even if the motor vehicle undergoes an impact in its longitudinal direction (X), i.e., the acceleration sensor element, which has its sensitivity axis in the X direction, responds to the deceleration of the motor vehicle caused by an impact of this type, the acceleration sensor element, which has its sensitivity direction in the Y direction, will also measure a portion of the deceleration due to the plastic structural deformation of the vehicle. To this extent, the output signal of the acceleration sensor element, whose sensitivity axis does not lie in the main direction of the impact, can be brought to bear for the plausibility check of the deployment decision, which is determined from the output signal of the acceleration sensor element oriented in the main direction of impact.

Accordingly, for a lateral impact, the acceleration signal measured by the acceleration sensor element, which has its sensitivity axis orthogonal to the direction of impact, can be brought to bear for the plausibility check in module 5. Here too, a trigger signal a2 for the lateral airbags is only emitted by an AND logic circuit 7 if both the deployment decision signal of module 3 and a plausibility signal of module 5 are present at its inputs at the same time. Module 5 for the plausibility check of the deployment decision, in response to a lateral impact, receives as an input signal the acceleration measured by the acceleration sensor element that has its sensitivity axis in longitudinal direction X of the motor vehicle.

The plausibility checks described, taking place in modules 4 and 5, guarantee greater reliability in the deployment decisions determined in modules 2 and 3, so that false deployments of restraining means are prevented.

For deploying lateral airbags, lateral impact sensors 8 and 9 are usually used for the right and the left sides of the vehicle. These lateral impact sensors are acceleration or pressure sensors that are arranged on the periphery of the vehicle. Lateral impact sensor 8 on the left side of the vehicle transmits its measured acceleration to a module 10, in which a deployment decision is determined for lateral airbags on the left side of the vehicle. Lateral impact sensor 9 on the right side of the vehicle is connected to a module 11, which determines a deployment decision for lateral airbags on the right side of vehicle. For both deployment decisions in modules 10 and 11, a plausibility check is carried out in module 12. For this purpose, the acceleration signal is used that is measured by the acceleration sensor element arranged centrally in the motor vehicle that has its sensitivity axis in the Y direction (vehicle transverse direction). There is also an AND logic circuit 13, which emits a trigger signal a3 for the lateral airbags on the left side of the vehicle if a plausibility signal from module 12 and a deployment decision signal from module 10 are present at its inputs. Similarly, a logic circuit 14 emits a trigger signal a4 for the lateral airbags on the right side of the vehicle if a plausibility signal from module 12 and a deployment decision signal from module 11 are present at its inputs.

Figure 2:
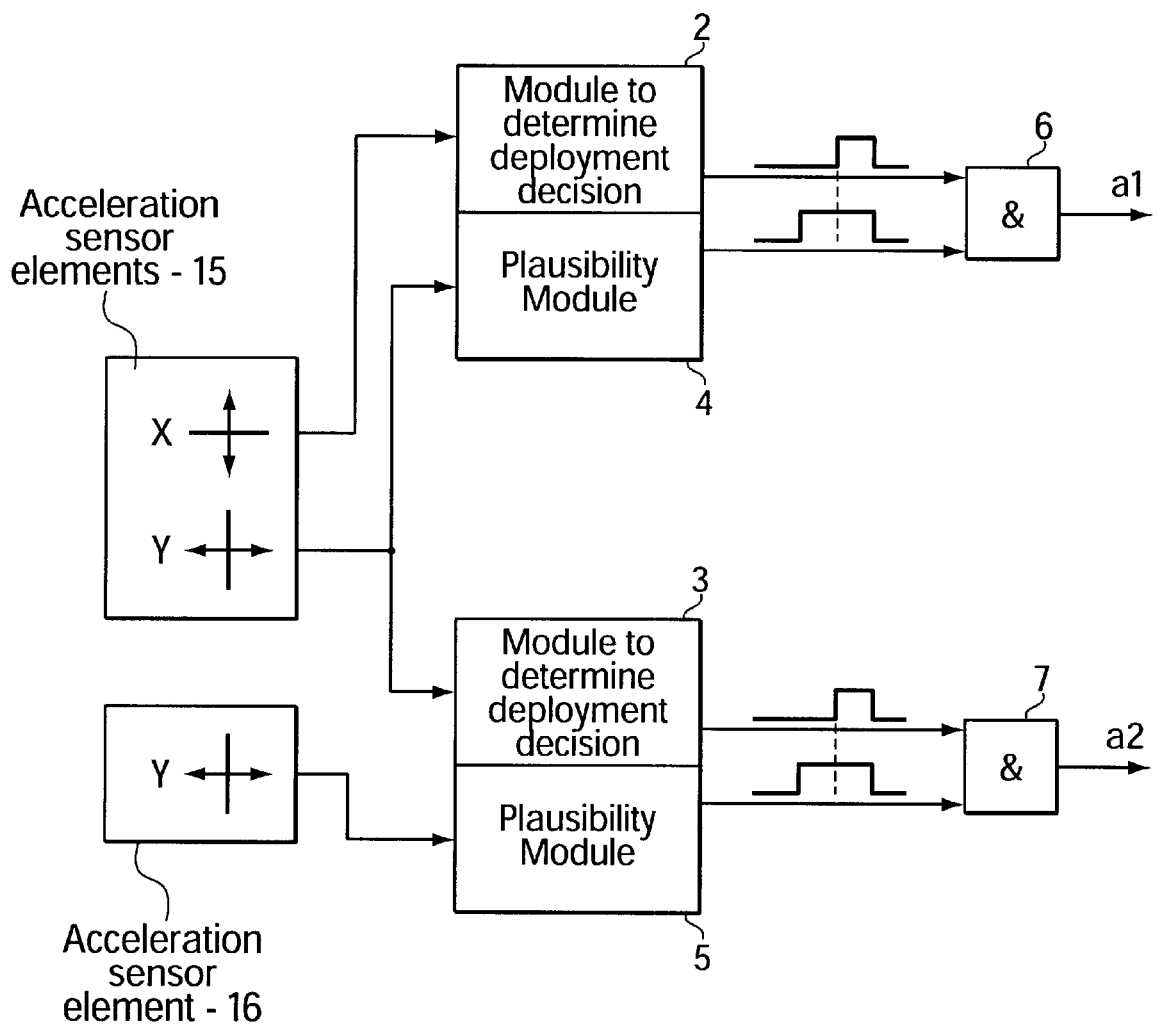
FIG. 2 shows a trigger device for a restraint system that has three acceleration sensor elements.

The exemplary embodiment depicted in FIG. 2 for a trigger device includes as in exemplary embodiment in FIG. 1, module 2, 3 for the derivation of deployment decision signals in response to front-end and rear-end impacts lateral impacts. This device also includes modules 4 and 5 for plausibility checks. As is shown in the exemplary embodiment in FIG. 1, AND logic circuits 6 and 7 emit trigger signals a1 and a2 if deployment decision signals from modules 2 or 3 and plausibility signals from modules 4 or 5 are present at its inputs. In contrast to the exemplary embodiment in FIG. 1, here three acceleration sensor elements are used. Two acceleration elements having sensitivity axes in the X and the Y directions are arranged on a common substrate 15, and there is a supplemental acceleration sensor element 16 that has its sensitivity axis also in the Y direction. The three acceleration sensor elements can also all be arranged individually on separate substrates.

In the same manner as in the exemplary embodiment in FIG. 1, the deployment decision in response to front-end or rear-end impacts is determined on the basis of the acceleration measured in the X direction, and a plausibility check for it is carried out on the basis of the acceleration signal measured by the acceleration sensor element that has its sensitivity axis in the Y direction.

The same acceleration signal measured in the Y direction is also fed to module 3 for determining a deployment decision in response to lateral impacts. The redundant acceleration element, which has a sensitivity axis also in the Y direction, functions exclusively for the plausibility check of the deployment decision signal in response to lateral impacts. Instead of designing in a redundant manner the acceleration sensor element, which has its sensitivity axis in the Y direction, it would be possible, conversely, to design in a redundant manner the acceleration element that has its sensitivity axis in the X direction. It is advantageous to provide a redundant acceleration sensor element for the direction of impact from which it is more likely that a false deployment may arise.

What is claimed is:

1. A method for deploying a restraint system in response to an impact of a motor vehicle against an obstacle, the motor vehicle including an acceleration sensor arrangement having two sensitivity axes, one arranged in the X-direction, and one in the Y-direction, with the X-direction describing the direction of travel, and the Y direction describing the vehicle transverse direction, the method comprising the steps of:

generating a trigger signal for the restraint system from measured accelerations using an evaluation circuit;

using a measured acceleration with respect to one of the two sensitivity axes for a plausibility check of a deployment decision;

determining the deployment decision as a function of a measured acceleration with respect to the other of the two sensitivity axes using the evaluation circuit; and emitting the trigger signal only if a deployment decision signal and a plausibility signal are present simultaneously at inputs of an AND logic circuit.

2. The method according to claim 1, further comprising the step of:

performing a reciprocal plausibility check, wherein:
the acceleration sensor arrangement includes two acceleration sensor elements having different sensitivity axes.

3. The method according to claim 1, wherein:

the acceleration sensor arrangement includes three acceleration sensor elements, two of three acceleration sensor elements having sensitivity axes oriented in one direction, a third of the three acceleration sensor elements having a sensitivity axis oriented in a second direction, the first direction being different from the second direction; and one of the two acceleration sensor elements having sensitivity axes oriented in one direction is used for the plausibility check of the third of the three acceleration sensor elements.

4. The method according to claim 1, wherein:

the two sensitivity axes include a first sensitivity axis oriented in a longitudinal direction and a second sensitivity axis oriented in a transverse direction.

5. The method according to claim 1, wherein:

an acceleration sensor element is arranged centrally in the motor vehicle and has a sensitivity axis in a transverse direction of the motor vehicle;

at least one lateral impact sensor is arranged on a periphery of the motor vehicle; and the at least one lateral impact sensor uses the acceleration sensor element for the plausibility check.

6. The method according to claim 1, further comprising the step of:

for the plausibility check, performing a threshold decision with respect to one of:
one of an amplitude, a gradient, and a polarity of the measured acceleration, and
one of an amplitude, a gradient, and a polarity of an integral of the measured acceleration.

7. A device for deploying a restraint system in response to an impact of a motor vehicle against an obstacle, comprising:

an acceleration sensor arrangement having two sensitivity axes, one arranged in the X-direction, and one in the Y-direction, with the X-direction describing the direction of travel, and the Y direction describing the vehicle transverse direction;

an evaluation circuit, the evaluation circuit generating a trigger signal for the restraint system as a function of measured accelerations, the evaluation circuit including an arrangement for performing a plausibility check of a deployment decision as a function of a measured acceleration with respect to one of the two sensitivity axes, the evaluation circuit determining the deployment decision as a function of a measured acceleration with respect to the other of the two sensitivity axes; and an AND logic circuit emitting the trigger signal if a deployment decision signal and a plausibility signal are present at inputs of the AND logic circuit at the same time.

* * * * *

UNITED STATES PATENT AND TRADEMARK OFFICE
CERTIFICATE OF CORRECTION

PATENT NO. : 6,487,482 B1 Page 1 of 1
DATED : November 26, 2002
INVENTOR(S) : Bernhard Mattes et al.

It is certified that error appears in the above-identified patent and that said Letters Patent is hereby corrected as shown below:

<u>Column 1,</u>
Delete lines 38 to 49.

Signed and Sealed this

Fourth Day of May, 2004

JON W. DUDAS
*Acting Director of the United States Patent and Trademark Office*